(12) United States Patent
Ko et al.

(10) Patent No.: US 8,537,176 B2
(45) Date of Patent: Sep. 17, 2013

(54) METHOD AND APPARATUS FOR GENERATING DITHERED IMAGE DATA FOR STEREOSCOPIC IMAGE DISPLAY

(75) Inventors: Hyun-Seok Ko, Cheonan-si (KR); Seung-Hwan Moon, Asan-si (KR); Jung-Hwan Cho, Goyang-si (KR); Myeong-Su Kim, Cheonan-si (KR)

(73) Assignee: Samsung Display Co., Ltd. (KR)

( * ) Notice: Subject to any disclaimer, the term of this patent is extended or adjusted under 35 U.S.C. 154(b) by 187 days.

(21) Appl. No.: 12/892,703

(22) Filed: Sep. 28, 2010

(65) Prior Publication Data

US 2011/0298789 A1     Dec. 8, 2011

(30) Foreign Application Priority Data

Jun. 7, 2010    (KR) .................. 10-2010-0053335

(51) Int. Cl.
*G09G 5/02*    (2006.01)

(52) U.S. Cl.
USPC ........................................... 345/596

(58) Field of Classification Search
USPC ........................................... 348/574
See application file for complete search history.

(56) References Cited

U.S. PATENT DOCUMENTS

| | | | |
|---|---|---|---|
| 7,327,373 B2 | 2/2008 | Hung | |
| 7,742,065 B2* | 6/2010 | Furihata et al. | 345/690 |
| 2010/0238193 A1* | 9/2010 | Neal et al. | 345/596 |
| 2010/0309381 A1* | 12/2010 | Nakagawa et al. | 348/705 |
| 2011/0001806 A1* | 1/2011 | Nakahata et al. | 348/56 |
| 2011/0012918 A1* | 1/2011 | Lee et al. | 345/596 |

* cited by examiner

*Primary Examiner* — Hau Nguyen
*Assistant Examiner* — Ryan M Gray
(74) *Attorney, Agent, or Firm* — Innovation Counsel LLP

(57) ABSTRACT

A method and apparatus capable of reducing or preventing dithering noises in 3D dither for displaying stereoscopic or 3D images are provided. The method entails generating image data in which two consecutive frames have the same dithered image data.

13 Claims, 11 Drawing Sheets

| $R_{11}$ | $R_{12}$ | $R_{13}$ | $R_{14}$ |
|---|---|---|---|
| $R_{21}$ | $R_{22}$ | $R_{23}$ | $R_{24}$ |
| $R_{31}$ | $R_{32}$ | $R_{33}$ | $R_{34}$ |
| $R_{41}$ | $R_{42}$ | $R_{43}$ | $R_{44}$ |

$R_{ij}$

+

| $D_{11}$ | $D_{12}$ | $D_{13}$ | $D_{14}$ |
|---|---|---|---|
| $D_{21}$ | $D_{22}$ | $D_{23}$ | $D_{24}$ |
| $D_{31}$ | $D_{32}$ | $D_{33}$ | $D_{34}$ |
| $D_{41}$ | $D_{42}$ | $D_{43}$ | $D_{44}$ |

$D_{ij}$

=

| $RO_{11}$ | $RO_{12}$ | $RO_{13}$ | $RO_{14}$ |
|---|---|---|---|
| $RO_{21}$ | $RO_{22}$ | $RO_{23}$ | $RO_{24}$ |
| $RO_{31}$ | $RO_{32}$ | $RO_{33}$ | $RO_{34}$ |
| $RO_{41}$ | $RO_{42}$ | $RO_{43}$ | $RO_{44}$ |

METHOD AND APPARATUS FOR GENERATING DITHERED IMAGE DATA FOR STEREOSCOPIC IMAGE DISPLAY

CROSS-REFERENCE TO RELATED APPLICATION(S)

This application claims the benefit, under 35 U.S.C. §119(a), of Korean Patent Application No. 10-2010-0053335 filed in the Korean Intellectual Property Office on Jun. 7, 2010, the entire disclosure of which is hereby incorporated by reference.

BACKGROUND OF THE INVENTION

1. Field of the Invention

The present invention relates generally to a method and apparatus for generating dithered image data for display of stereoscopic or 3-Dimensional (3D) images, and more particularly, to a method and apparatus for generating dithered image data that displays stereoscopic images to users of liquid crystal shutter glasses.

2. Description of the Related Art

As is well known, stereoscopic or 3D images may be made by displaying a pair of stereoscopic images, i.e., a left-eye image and a right-eye image, on display screens of 2-Dimensional (2D) media, such as Liquid Crystal Display (LCD) devices. If a viewer watches the right-eye images with the right eye and the left-eye images with the left eye, the viewer may recognize 3D images from the two stereoscopic images on the 2D media. Accordingly, the viewer may watch stereoscopic images when left-eye images and right-eye images are displayed on a 2D media in an alternating manner for the stereoscopic image display while wearing liquid crystal shutter glasses. The liquid crystal shutter glasses are designed such that the liquid crystals covering the left eye and the liquid crystals covering the right eye take turns enabling and disabling light transmission in an on/off manner synchronized with the predetermined period of the 2D display media.

In general, an LCD panel includes a lower substrate, an upper substrate with common electrodes, and liquid crystals sealed between the lower substrate and the upper substrate. The lower substrate has a plurality of thin film transistors TFTs arranged in a matrix consisting of rows and columns. Data lines are in the columns connected to the sources of the TFTs, gate lines are in the rows connected to the gates of the TFTs, and pixel electrodes are connected to the drains of the TFTs. Each pixel may include an associated pixel electrode, a common electrode, and liquid crystals between the electrodes. In order for the LCD panel to express colors, each pixel has primary-color sub-pixels, for example, Red (R), Green (G) and Blue (B) sub-pixels.

An LCD device is a device for driving an LCD panel to display images on the LCD panel. An LCD device typically includes a timing controller, a source or gate driver, and a data driver. The timing controller receives digital R, G and B data, control signals associated with operation modes, and a main clock from graphics controller cards of computers and/or broadcasting stations, and generates a first control signal including a gate or vertical start pulse GSP and a gate clock GCK, and a second control signal including a horizontal start pulse HSP, a horizontal clock HCK, and a data latch pulse DLP. The source or gate driver receives the first control signal and sequentially drives or scans the gate lines. The data driver receives the second control signal and the digital R, G and B data, and outputs, to the data lines, analog voltages indicating gray levels for the respective sub-pixels.

Dithering, which is a technique for changing the number of gray levels, is well known. The number of colors or gray levels expressible with the R, G and B data each having P bits is defined as $2^{3P}$. However, if each of the R, G and B data is processed as data of an m×n dither sub-pixel block dithered using a dither pattern formed in an m×n dither sub-pixel block having m rows and n columns, the number of gray levels for each of the R, G and B data may increase m×n times compared with the number of gray levels expressible by each of the R, G and B data.

The above dithering technique has been used for display devices that are incorporated into devices such as cell phones and Personal Computers (PCs) to display images on the conventional 2D media. If this method of displaying dithered images on the 2D media is applied to the 3D image display method in which users watch images using liquid crystal shutter glasses, a dithering noise phenomenon such as flickering and horizontal-line patterns occurs on stereoscopic image screens. Thus, a new 3D image display method and apparatus is required that can prevent the dithering noise phenomenon.

SUMMARY OF THE INVENTION

An aspect of the present invention is to address at least the above-mentioned problems and/or disadvantages and to provide at least the advantages described below. Accordingly, an aspect of the present invention provides a stereoscopic or 3D image display method and apparatus capable of preventing the dithering noise phenomenon.

Another aspect of the present invention provides a method and apparatus for generating dithered image data, which can prevent the dithering noise phenomenon in a 3D image display device in which users watch stereoscopic images using liquid crystal shutter glasses.

In accordance with one aspect of the present invention, there is provided a method for generating dithered image data for stereoscopic image display, the method including reading out dither sub-pixel values according to an address that includes predetermined bits of image data and bits representing one of a plurality of frames; and adding the dither sub-pixel values to image sub-pixel values of the image data and generating dithered image data for each of the frames. The dithered image data, adjacent odd and even frames among the frames may have the same dithered image data.

Pairs of adjacent odd and even frames may have different dithered image data.

In accordance with another aspect of the present invention, there is provided an apparatus for generating dithered image data for stereoscopic image display, the apparatus including an image memory for storing dither sub-pixel values according to an address that includes predetermined bits of image data and bits representing one of a plurality of frames; and an image logic and adder unit for generating dithered image data for each of the frames by adding dither sub-pixel values read out from the image memory by the address, to image sub-pixel values of the image data so that adjacent odd and even frames among the frames have the same dithered image data.

Pairs of adjacent odd and even frames may have different dithered image data.

In accordance with yet another aspect of the present invention, there is provided a stereoscopic image display apparatus for allowing a user to view a stereoscopic image using liquid crystal shutter glasses having a left-eye liquid crystal and a right-eye liquid crystal, the apparatus including a Liquid Crystal Display (LCD) panel including a plurality of sub-pixels arranged on intersections between data lines and gate lines; a gate driver for scanning the gate lines; a data driver for providing analog sub-pixel values from image data having left and right image data, to the data lines; and a data processor for generating left image data in periods of odd frames by adding left dither sub-pixel values to image sub-pixel values of image data received when the left-eye liquid crystal is turned on and the right-eye liquid crystal is turned off, and generating right image data in periods of even frames by adding right dither sub-pixel values to image sub-pixel values of image data received when the left-eye liquid crystal is turned off and the right-eye liquid crystal is turned on. Frames in each of pairs of adjacent odd and even frames may have the same image data, each pair including an odd frame and its succeeding even frame.

The pairs of adjacent odd and even frames may have different image data.

BRIEF DESCRIPTION OF THE DRAWINGS

The above and other aspects, features and advantages of certain exemplary embodiments of the present invention will be more apparent from the following description taken in conjunction with the accompanying drawings, in which:

FIG. 4 is a diagram showing sub-pixel values R-dithered by adding R data's sub-pixel values to dither sub-pixel values in FIG. 3;

DETAILED DESCRIPTION OF EXEMPLARY EMBODIMENTS

Figure 1:
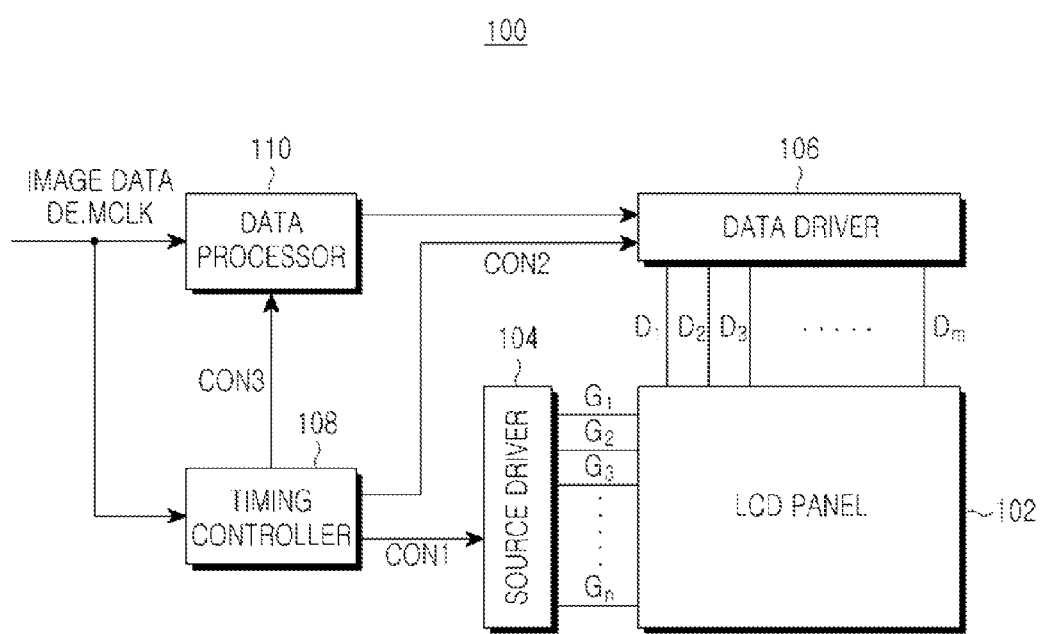
FIG. 1 is a schematic block diagram of a 3D or stereoscopic LCD device according to an exemplary embodiment of the present invention.

How to manufacture and use a device for generating dithered image data for 3D image display according to an embodiment of the present invention will be described in detail. Throughout the drawings, the same drawing reference numerals will be understood to refer to the same elements, features and structures. It should be noted that although various numerals are mentioned in exemplary embodiments of the present invention, such numerals are not intended to limit the scope of the present invention.

In this specification, "image data" or "picture data" may be construed to include Red, Green and Blue data.

Referring to FIG. 1, a Liquid Crystal Display (LCD) panel 102 has sub-pixels arranged in a matrix consisting of n rows and m columns. In the case of a color LCD device, each pixel consists of primary-color sub-pixels, e.g., Red, Green and Blue sub-pixels, arranged in the row direction. As the LCD panel usually contains the same number of Red, Green, and Blue sub-pixels, m is usually a multiple of 3. Each of the sub-pixels arranged in n rows are connected to associated respective one of the gate lines $G_1$~$G_n$, and each of the sub-pixels arranged in m columns are connected to associated respective one of the data lines $D_1$~$D_m$. A timing controller 108 receives a Data Enable (DE) signal, a main clock MCLK, and image data from a computer graphics controller card (not shown) and/or broadcasting stations, and generates timing signals. A source driver 104 generates a signal for sequentially driving the gate lines $G_1$~$G_n$ in response to a first control signal CON1 including a gate or vertical start pulse GSP and a gate clock GCK generated in the timing controller 108. A data driver 106 provides analog voltages indicating gray levels to the data lines $D_1$~$D_m$ in response to a second control signal CON2 including a horizontal start pulse HSP, a horizontal clock HCK and a data latch pulse DLP generated in the timing controller 108, and to image data dithered by a data processor 110 described below. The timing controller 108 generates a frame count signal, a line count signal and a sub-pixel count signal constituting a third control signal CON3 using a frame start pulse, a horizontal or line start pulse, and a sub-pixel or pixel start pulse in response to the DE signal and the main clock MCLK. In accordance with the features of the present invention, the data processor 110 converts input image data into dithered image data in response to the third control signal CON3. The data processor 110 according to the present invention generates the same dithered image data in odd and even frames of each of adjacent-frame pairs, i.e., pairs of adjacent odd and even frames, to process 3D images in response to the third control signal CON3 and the input image data.

Figure 2:
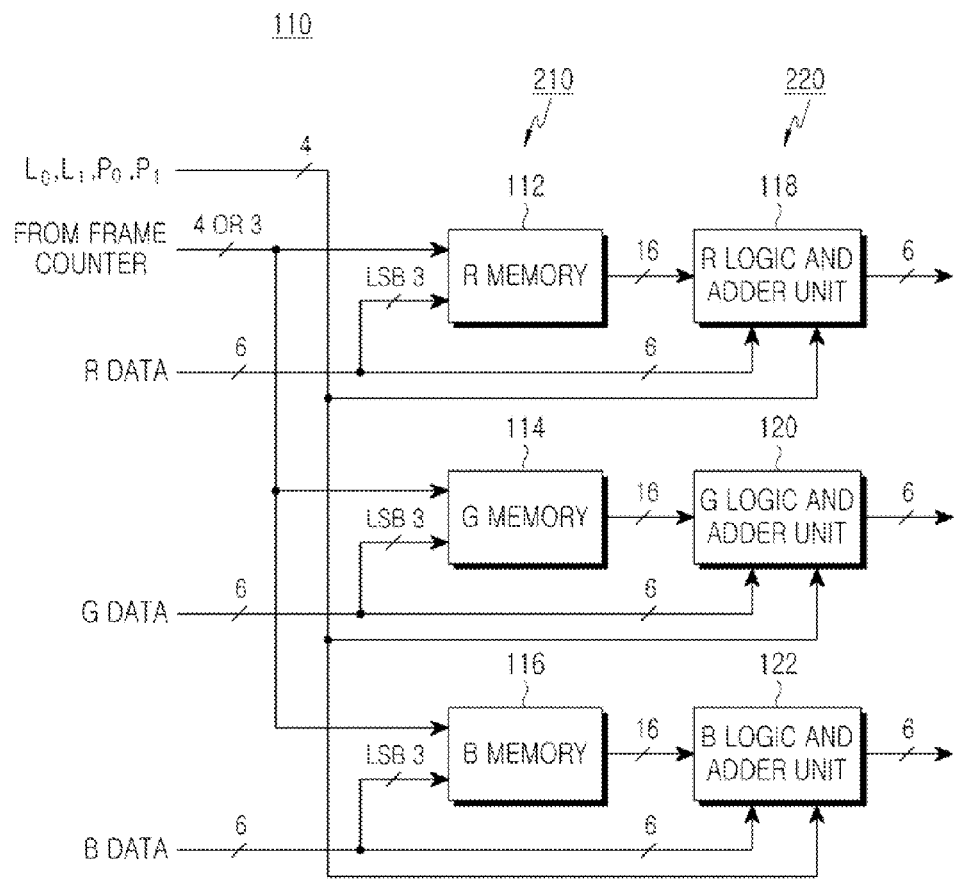
FIG. 2 is a schematic block diagram of the data processor shown in FIG. 1.

Referring to FIG. 2, a schematic block diagram is shown that represents the data processor 110 in FIG. 1 according to the features of the present invention. For simplicity of explanation, it is assumed that the LCD panel 102 in FIG. 1 has a resolution of 1366×768 (i.e., it has pixels in 768 rows and 1366 columns).

The data processor 110 includes R, G and B memories 112, 114 and 116, and their associated R, G and B logic and adder units 118, 120 and 122. The R, G and B memories 112, 114 and 116 constitute an image memory 210, and the R, G and B logic and adder units 118, 120 and 122 constitute an image logic and adder unit 220. Upon powering on, each of the R, G and B memories 112, 114 and 116 loads dither sub-pixel values of dither patterns from an Electrically Erasable Programmable Read Only Memory (EEPROM) that have stored the dither patterns together with the system software. The R, G and B memories 112, 114 and 116, constituting the image memory 210, receive address signals that include the Least Significant Bit (LSB) 3 bits (as upper 3 bits) of input R, G and B data and lower 4 bits from a frame counter described below, and output dither sub-pixel values of dither patterns corresponding to these address signals. The R, G and B data, each of which consists of 6 bits, are input to the R, G and B logic and adder units 118, 120 and 122, respectively. The R, G and B logic and adder units 118, 120 and 122 receive line count signals $L_0$ and $L_1$ indicating line positions in the dither patterns and sub-pixel count signals $P_0$ and $P_1$ indicating sub-pixel positions in the dither patterns, which are described below, add each of the image data to dither sub-pixel values of the corresponding dither pattern, and output dithered image data.

In an embodiment of the present invention, the dither pattern is formed in a 4×4 dither block. However, it should be noted that the dither patterns of the present invention are not limited to these dither patterns. Accordingly, those of ordinary skill in the art will recognize that any dither patterns in the form of a matrix may be used.

Figure 3:
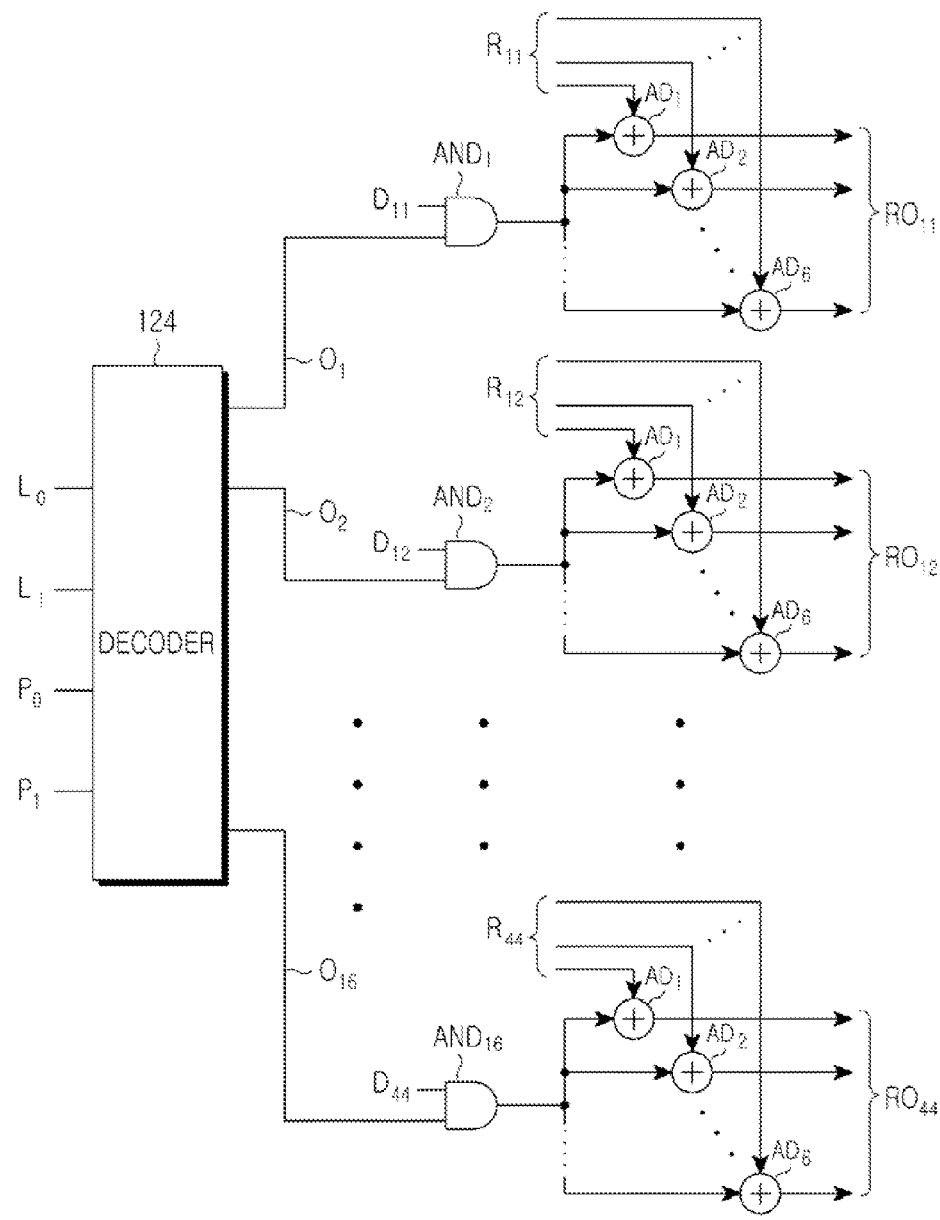
FIG. 3 is a schematic circuit diagram showing the R logic and adder unit associated with Red data, shown in FIG. 2.

Referring to FIG. 3, a schematic circuit diagram is shown that represents the R logic and adder unit 118 in FIG. 2. It should be apparent to those skilled in the art that the G and B logic and adder units 120 and 122 have substantially the same circuits as that of the R logic and adder unit 118 except for the input data and dither sub-pixel values. In the interest of avoiding redundancy, only the R logic and adder unit 118 will be described.

A decoder 124 receives line count signals $L_0$ and $L_1$ and sub-pixel count signals $P_0$ and $P_1$ from a line counter and a sub-pixel counter, respectively, which are described below, and outputs a logic "1" on its output lines $O_1 \sim O_{16}$ in sequence. Thus, based on the sequential logic "1" on the output lines $O_1 \sim O_{16}$, AND gates $AND_1 \sim AND_{16}$ sequentially output dither sub-pixel values $D_{11}$, $D_{12}$, $D_{13}$, $D_{14}$, $D_{21}$, $D_{22}$, ..., $D_{44}$ of the dither pattern, which have been read out from the R memory 112. The dither sub-pixel values $D_{11}$, $D_{12}$, $D_{13}$, $D_{14}$, $D_{21}$, $D_{22}$, ..., $D_{44}$, which have been sequentially output from the AND gates $AND_1 \sim AND_{16}$, are sequentially added to sub-pixel values $R_{11}$, $R_{12}$, $R_{13}$, $R_{14}$, $R_{21}$, $R_{22}$, ..., $R_{44}$ of the 6-bit R data by adders $AD_1 \sim AD_6$, respectively. The adders $AD_1 \sim AD_6$ sequentially output R-dithered sub-pixel values $RO_{11}$, $RO_{12}$, $RO_{13}$, $RO_{14}$, $RO_{21}$, $RO_{22}$, ..., $RO_{44}$.

Referring to FIG. 4, R-dithered sub-pixel values are shown that are obtained by adding R data's sub-pixel values to dither sub-pixel values in FIG. 3. The subscript "ij" means a j-th column on an i-th row, where "i" and "j" each are an integer between 1 and 4. For example, $R_{32}$ represents an R data's sub-pixel value of a sub-pixel that receives signals from a $2^{nd}$ data line and a $3^{rd}$ gate line. Similarly, $D_{32}$ means a dither pattern's dither sub-pixel value of a sub-pixel located at the $2^{nd}$ column (or $2^{nd}$ data line) and the $3^{rd}$ row (or $3^{rd}$ gate line). Thus, an R-dithered sub-pixel value $RO_{32}$ of the sub-pixel located at the intersection of the $3^{rd}$ gate line and the $2^{nd}$ data line is a sum of $R_{32}$ and $D_{32}$.

Figure 5:
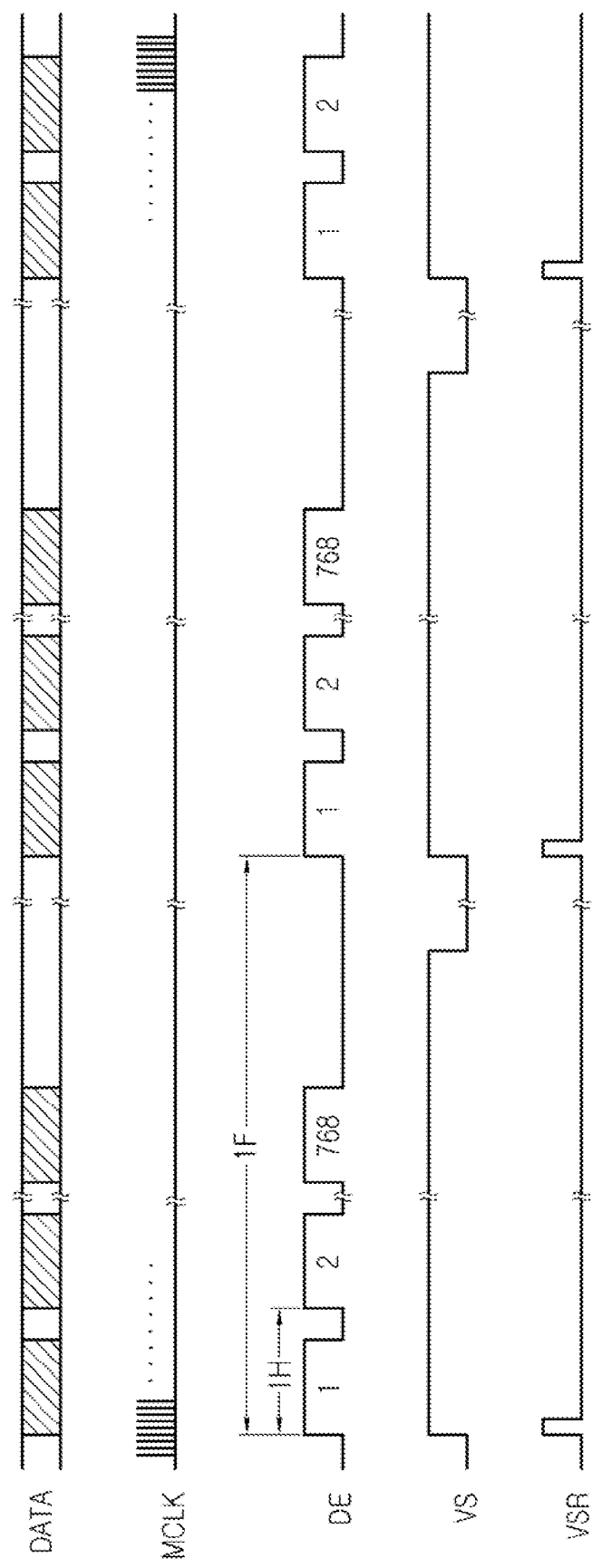
FIG. 5 is a timing diagram showing operation timings of the present invention, in which a data enable signal DE, R, G and B data, and a main clock MCLK are input.

Referring to FIG. 5, a timing diagram is shown that represents generation of a frame detection signal (or frame identification signal) VS and a rising edge detect signal (or a frame start pulse VSR) for the frame detection signal VS, in which image data DATA, a main clock MCLK, and a Data Enable (DE) signal are input from a computer graphics controller card. Since the resolution of 1366×768 is considered, one vertical or frame period 1F has 768 horizontal pulses 1H, and valid data is input at High levels of the horizontal pulses. The one frame 1F has an invalid data period of a Low level corresponding to about 7 to 100 horizontal pulses, following the 768 horizontal pulses. The next 1F period is repeated. The frame identification signal VS of one frame period 1F is a signal that maintains its High level through a preset number of main clocks MCLK after counting 768 High pulses beginning from the rising edge of the DE signal. The frame start pulse VSR is a signal obtained by detecting a rising edge of the frame identification signal VS. A person skilled in the art would understand that because the frame identification signal VS is a signal used to detect the frame start pulse VSR, the signal VS can be a signal that becomes a High level at the rising edge of the first horizontal pulse and then goes to a Low level at an appropriate time before the next frame starts, after 768 horizontal pulses.

Figure 6:
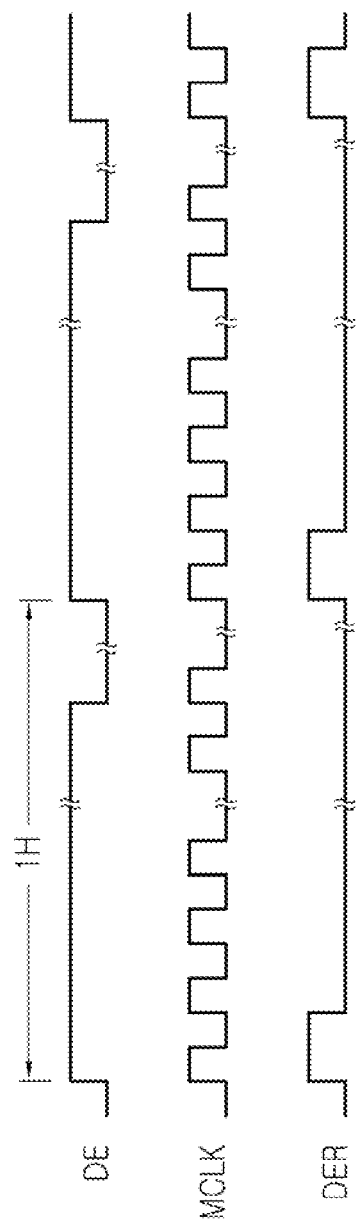
FIG. 6 is a timing diagram showing operation timings of the present invention, representing the horizontal periods 1H in one frame 1F of FIG. 5.

Referring to FIG. 6, an enlarged timing diagram is shown that represents horizontal periods 1H, the main clock MCLK, and a horizontal start signal DER for each of the horizontal periods 1H in one frame period 1F. During each horizontal period 1H for which the data enable signal DE maintains the High level, the main clock MCLK has 1366 clock pulses. The horizontal start signal DER is a signal obtained by detecting a rising edge of the data enable signal DE. Therefore, the horizontal start signal DER can be a gate start pulse.

Figure 7:
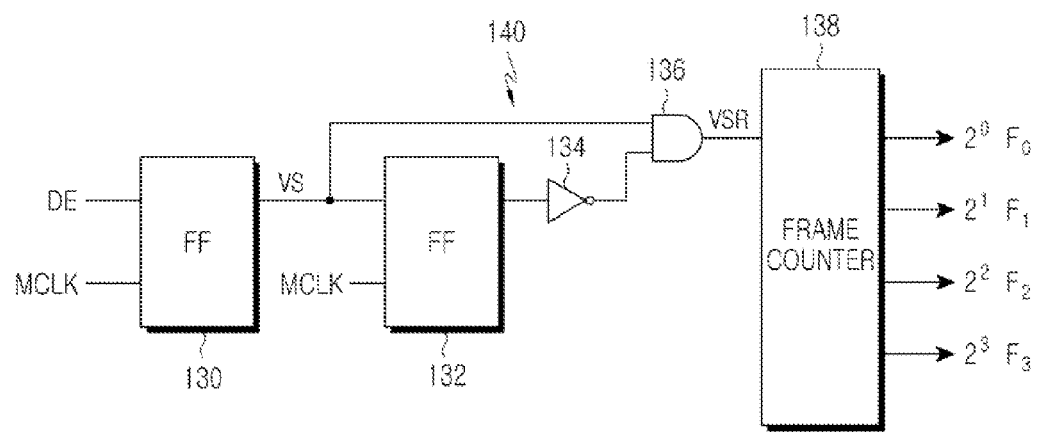
FIG. 7 is a schematic circuit diagram for generating the frame identification signal VS and the frame start pulse VSR in FIG. 5, and a frame count signal.

FIG. 7 is a schematic circuit diagram for generating the frame identification signal VS and the frame start pulse VSR in FIG. 5, and a 4-bit frame count signal.

A flip-flop (FF) 130 may be a JK flip-flop that receives the data enable signal DE via a J terminal, the main clock MCLK via a clock terminal CLK, and the signal, which goes to a Low level at an appropriate time after 768 horizontal pulses, via a K terminal, and generates the frame identification signal VS in FIG. 5. A rising edge detection circuit 140, consisting of a flip-flop 132, an inverter 134 and an AND gate 136, detects a rising edge of the frame identification signal VS. The rising edge detection circuit 140 generates a frame start pulse VSR obtained by detecting the rising edge of the frame identification signal VS. A frame counter 138 is a 4-bit up-counter for counting the frame start pulse VSR. The frame counter 138 is reset after counting $2^4=16$.

Figure 8:
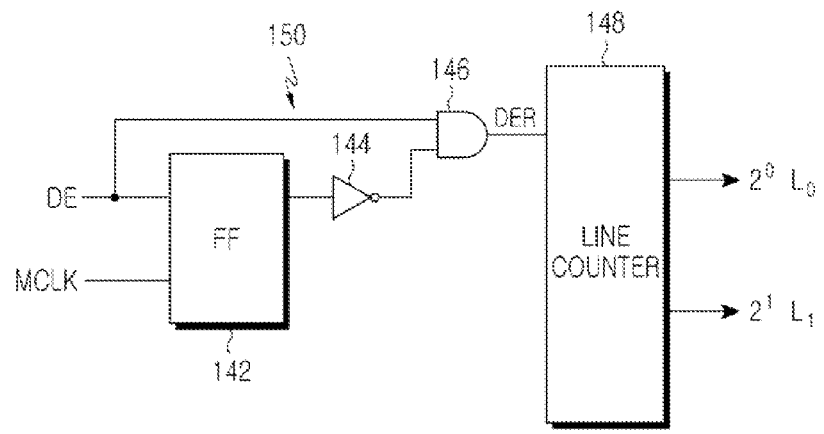
FIG. 8 is a schematic circuit diagram for generating a horizontal start signal DER and a line count signal.

FIG. 8 is a schematic circuit diagram for generating the horizontal start signal DER in FIG. 6 and a line count signal. A rising edge detection circuit 150 for detecting a rising edge of the data enable signal DE includes a flip-flop 142, an inverter 144, and an AND gate 146, and generates the horizontal start signal DER. A line counter 148 is a 2-bit up-counter for counting the horizontal start signal DER, and is reset after counting $2^2=4$. The line counter 148 outputs line count signals $L_0$ and $L_1$.

Although not shown, there may be a sub-pixel counter, which is a 2-bit up-counter that is reset at a rising edge of the horizontal start signal DER and counts a rising edge of an inverted signal of the main clock MCLK. The sub-pixel counter generates sub-pixel count signals $P_0$ and $P_1$.

Figure 9:
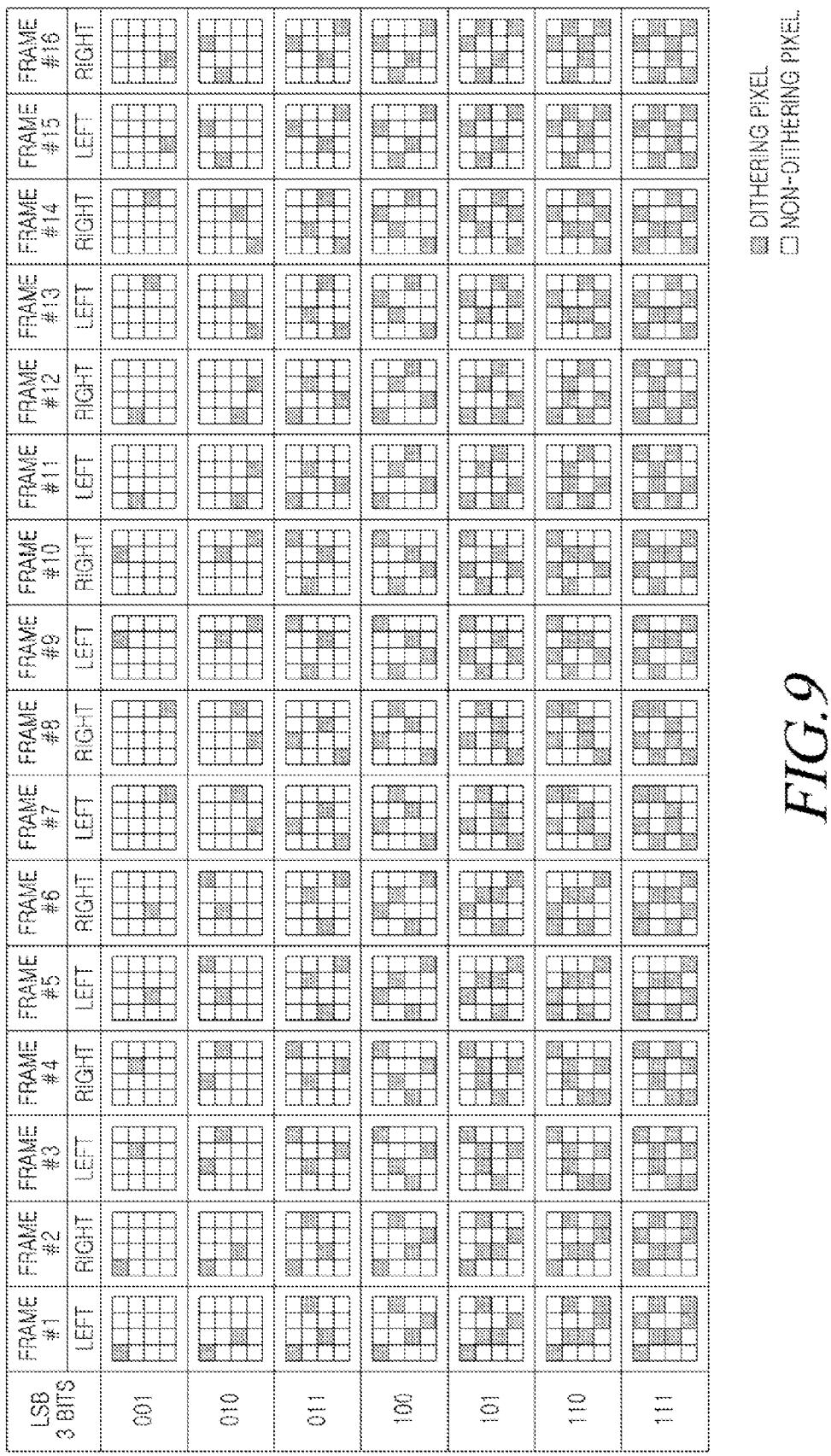
FIG. 9 is a diagram showing dither patterns for 3D image display, stored in the R, G and B memories in FIG. 2.

FIG. 9 is a diagram showing dither patterns stored in the image memory in FIG. 2 to increase a gradation display capability for 3D images, in which relationships are shown between dither sub-pixel values and bit values of image data's LSB 3 bits associated with multiple frames, i.e., first to sixteenth frames. It is to be noted that although dither patterns of first to sixteenth frames associated with LSB 3 bits of '000' are not shown in FIG. 9, they are dither patterns in which all dither sub-pixel values have a digital value of "0." As can be seen from FIG. 9, it should be noted that each of frame pairs consisting of odd frames and their succeeding adjacent even frames, i.e., a frame pair of the first and second frames, a frame pair of the third and fourth frames, ..., a frame pair of the fifteenth and sixteenth frames, has the same dither patterns. Hence, the dither patterns representing left-eye images and right-eye images for the 3D image display are equal in each of the frame pairs. As described above, each dither pattern may be a 4×4 dither block consisting of dither sub-pixels. Therefore, each dither pattern may be expressed as a matrix consisting of i rows and j columns. For each dither pattern shown in FIG. 9, i=1, 2, 3, 4, and j=1, 2, 3, 4. Each dither pattern may be expressed with a series of dither sub-pixel values on the consecutive rows or lines, i.e., dither pixel values $D_{ij}=D_{11}$, $D_{12}$, $D_{13}$, $D_{14}$, $D_{21}$, $D_{22}$ ... $D_{44}$, and these dither sub-pixel values may be stored in each of the R, G and B memories 112, 114 and 116. The dither patterns are stored in each of the R, G and B memories 112, 114 and 116 in FIG. 2 so that they can be read with an address consisting of a total of 7 bits, including lower 4 bits and upper 3 bits. The lower 4 bits of the address represent serial numbers of the frames and the upper 3 bits represent the number of dither sub-pixels of each dither pattern. Herein, dither sub-pixels represent sub-pixels having a digital dither value "1" and non-dither sub-pixels represent sub-pixels having a digital dither value "0." The upper 3 bits of the address represent LSB 3 bits of the input image data, and the lower 4 bits are output bits $F_0$~$F_3$ of the frame counter 138. Accordingly, an upper value of the upper 3 bits of the address indicates the number of dither sub-pixels having a digital dither value "1" and a lower value of the lower 4 bits indicates a frame number. Assuming that an address of, for example, 1010001 is input to address terminals of the R memory 112 in FIG. 2, because an upper value of the upper 3 bits "101" of the address is 5 and a lower value of the lower 4 bits "0001" is 1, the address is used to read out, from the R memory 112, a dither pattern (i.e., dither sub-pixel values of 1000, 0101, 0100, 0010) corresponding to the LSB 3 bits "101" of the R data and the second frame.

Figure 10:
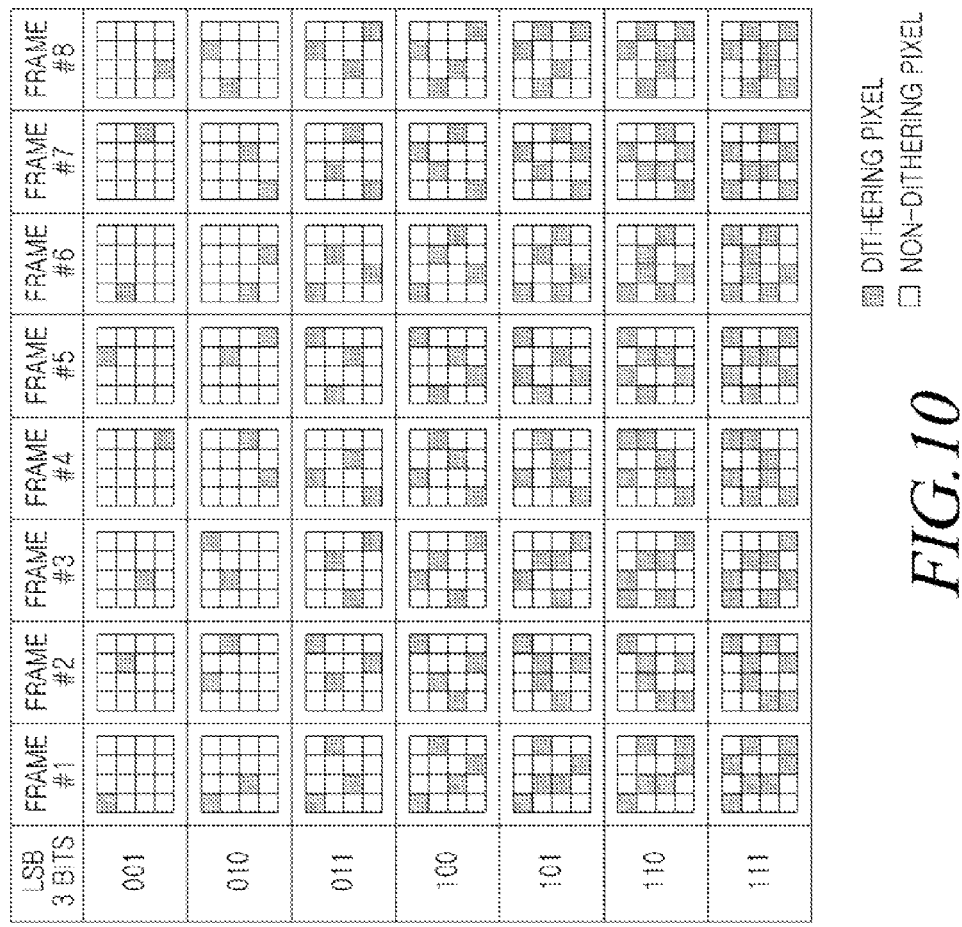
FIG. 10 is a diagram showing dither patterns for 2D image display, stored in the R, G and B memories in FIG. 2.

FIG. 10 is a diagram showing dither patterns stored in the image memory, for gradation display of 2D images. As described above in conjunction with FIG. 9, dither patterns of first to eighth frames associated with LSB 3 bits "000" are omitted for convenience of illustration. For gradation display of 2D images, each address consists of a total of 6 bits. Due to the presence of 8 frames, each address consists of lower 3 bits representing a frame number and upper 3 bits representing, as described above, dither sub-pixels having a digital dither value "1." Similarly, as described with reference to FIG. 9, each of the R, G and B memories 112, 114 and 116 may store dither patterns so as to read out dither patterns corresponding to an address consisting of LSB 3 bits (as upper 3 bits) of each of the R, G and B data and lower 3 bits from a 3-bit frame counter.

Figure 11A:
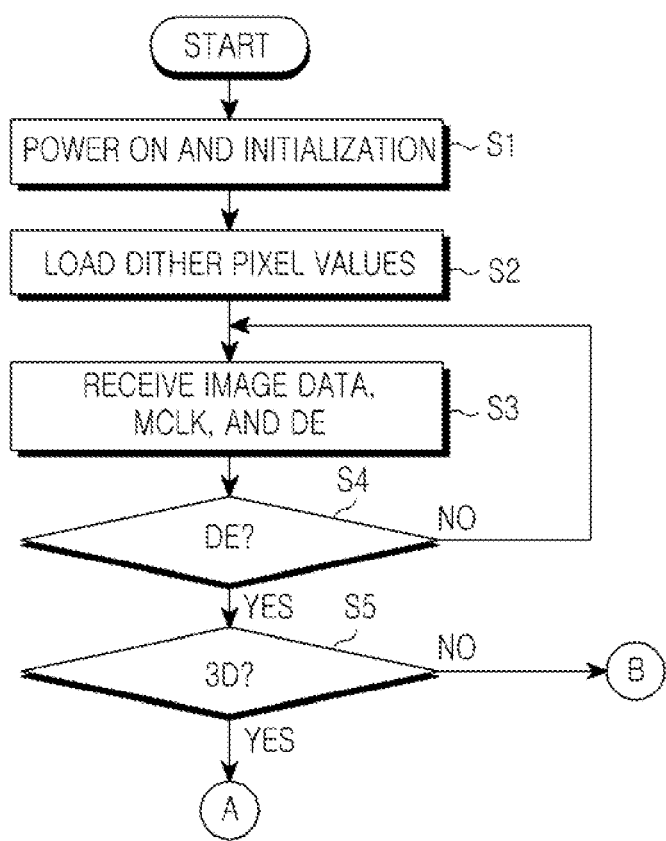
FIGS. 11A and 11B are flowcharts for displaying stereoscopic images according to an exemplary embodiment of the present invention.
Figure 11B:
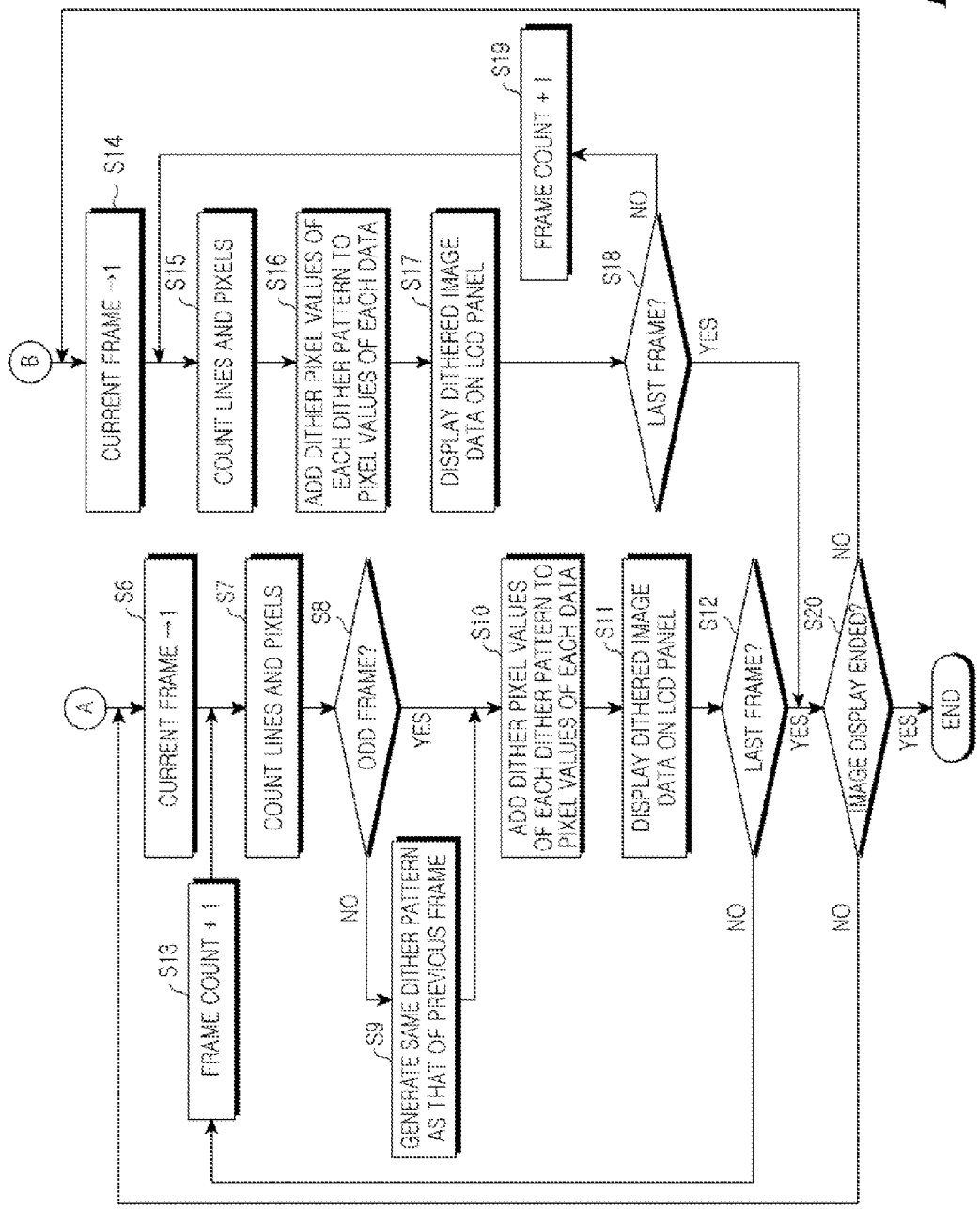

FIGS. 11A and 11B are flowcharts showing a method for displaying stereoscopic or 3D images according to an exemplary embodiment of the present invention.

A method for generating dithered image data for 3D image display according to an embodiment of the present invention will be described in detail below with reference to FIGS. 11A and 11B.

If the LCD device 100 in FIG. 1 is powered on and the counters are initialized by being reset in step S1, dither patterns stored in the EEPROM (not shown), in which various operation programs are stored, are loaded in the R, G and B memories 112, 114 and 116 shown in FIG. 2 in step S2. The 3D dither patterns stored in each of the R, G and B memories 112, 114 and 116, constituting the image memory 210, include a series of dither sub-pixels described in conjunction with FIG. 9. Thus, according to the features of the present invention, the 3D dither patterns of adjacent odd and even frames are the same. In addition, the dither sub-pixel values of the 2D dither patterns stored in the EEPROM, which have been described in conjunction with FIG. 10, may be loaded in the image memory 210 upon powering on. The dither sub-pixels of any one of the 2D dither patterns are different from dither sub-pixels of other dither patterns, and there are no two same dither patterns. No two pairs of frames have the same dithered image data.

In step S3, the image data, the main clock MCLK and the data enable signal DE are input to the LCD device 100. In step S4, it is determined whether the DE signal is present. In the absence of the DE signal, the LCD device 100 returns to step S3. However, in the presence of the DE signal, it is determined in step S5 whether the user has selected 'Display 3D Images'. The user may select 'Display 2D images' or 'Display 3D Images' using a display mode selection device. The display mode selection device may include a select switch and a multiplexer for selecting 'Display 3D Images' or 'Display 2D Images' depending on an electrical digital signal from the switch. Assuming that the user has selected 'Display 3D Images', if the frame count outputs $F_3F_2F_1F_0$ and the frame counter 138 indicates a first frame, the current frame is set as "1" in step S6. In step S7, line count signals $L_1L_0$ and sub-pixel count signals $P_1P_0$ are output from the line counter 148 and the sub-pixel counter (not shown), respectively. The dither patterns stored in the image memory 210 may be read out with a 7-bit address consisting of lower bits $F_3F_2F_1F_0$ output from the frame counter 138 and LSB 3 bits (upper bits) of each of the R, G and B data, or the image data. Assuming that, for example, $F_3F_2F_1F_0$ are 0000 and LSB 3 bits are 100, the address becomes 1000000 and can be used to read out, from the image memory 210, dither sub-pixel values 1000, 0001, 0100, 0010 of the dither pattern for the first frame, having 4 dither values. If the read dither sub-pixel value is defined as $D_{ij}$ where "i" represents a row or a line and "j" represents a column or a sub-pixel, then $D_{ij}$ means a j-th sub-pixel on the i-th line. Thus, the signals $L_0L_1$ and $P_0P_1$ of the 2-bit line counter 148 and the 2-bit sub-pixel counter may designate the j-th sub-pixel on the i-th line.

In step S8, it is determined whether an output value of the frame counter 138 indicates the first or odd-numbered frame. Since the current frame is the first frame, the LCD device 100 goes to step S10, in which dither sub-pixel values $D_{ij}$ of each dither pattern and sub-pixel values $R_{ij}$ of R data are added to generate dithered R data $RO_{ij}$ as described with reference to FIGS. 3 and 4. For instance, if the signals $L_0L_1$ of the line counter 148 is 00, indicating i=1, then the first line is selected in the dither pattern, or the 4×4 dither block. Then, the sub-pixel counter increases its count one by one, and is reset after counting 4. That is, the signals $P_1P_0$ of the sub-pixel counter are sequentially output as 00, 01, 10, 11, which designate dither sub-pixel values $D_{11}$, $D_{12}$, $D_{13}$, $D_{14}$, respectively. Thereafter, the signal $L_1L_0$ of the line counter 148 becomes 01, designating the second line. As stated above, the sub-pixel counter sequentially counts the sub-pixels, and is reset after counting to 4. Thus, dither sub-pixel values $D_{21}$, $D_{22}$, $D_{23}$, $D_{24}$ are designated. In this manner, 16 dither pixel values $D_{11}$, $D_{12}$, $D_{13}$, $D_{14}$, $D_{21}$, . . . , $D_{44}$ of the dither pattern are designated. Then, the dither sub-pixel values $D_{ij}$ of the dither pattern and the sub-pixel data values $R_{ij}$ of the R data are added, respectively, according to the outputs $P_1P_0L_1L_0$ of the line counter and the sub-pixel counter, as described in conjunction with FIG. 3 regarding the R logic and adder unit 118, and 16 dithered 6-bit R data $RO_{ij}$ are output from the image logic and adder unit 220. In step S11, the 4×4 data block of the dithered image data of the first frame is repeatedly displayed on the LCD panel 102. For example, in the case of input R data, when a gate turn-on voltage is applied to a gate line $G_1$, analog values corresponding to 4 dithered data $RO_{11}$, $RO_{12}$, $RO_{13}$, $RO_{14}$ are repeatedly provided to the sub-pixels on the gate line $G_1$ through data lines $D_1$~$D_m$. Subsequently, upon turn-on of a gate line $G_2$, analog values corresponding to dithered data $RO_{21}$, $RO_{22}$, $RO_{23}$, $RO_{24}$ are repeatedly provided to the sub-pixels on the gate line $G_2$. After analog values corresponding to dithered data $RO_{41}$, $RO_{42}$, $RO_{43}$, $RO_{44}$ are repeatedly provided to the sub-pixels on a gate line $G_4$ in the same manner, upon turn-on of a gate line $G_5$, analog values corresponding to the dithered data $RO_{11}$, $RO_{12}$, $RO_{13}$, $RO_{14}$ are repeatedly provided to the sub-pixels on the gate line $G_5$. In this manner, the 4×4 data block is repeatedly displayed on the LCD panel 102.

Because the current frame is not the last frame or the 18$^{th}$ frame in step S12, the LCD device 100 goes to step S13, in which the frame number is incrementally raised by one to set the next frame as the current frame. In step S7, the reset line counter and sub-pixel counter operate as described above. Since the current frame is the second frame or an even frame in step S8, the LCD device 100 goes to step S9, in which it generates the same dither pattern as that of the previous frame. Thus, according to the features of the present invention, the first frame or odd frame and its adjacent even frame have the same dither patterns. After step S9, the above-described steps S10 and S11 are performed in the second frame in the aforementioned manner. Since the current frame or the second frame is not the last frame, the LCD device 100 goes to step S13, in which it sets the third frame as the current frame, and then performs steps S7, S8, S10 and S11. Since the third frame is not the last frame, the LCD device 100 sets the fourth frame as the current frame in step S13, and then performs steps S7, S8, S9, S10 and S11. The above-described processes are repeatedly performed until the current frame is the last frame. In the meantime, if the current frame is the last frame, i.e., if the frame counter 138 counts 16 frames, the frame counter 138 is reset, and returns to step S6. The steps S6~S12 and step S20 are repeated until the 3D image display process ends in step S20.

If the user selects 'Display 2D Images', not 'Display 3D Images', in step S5, the LCD device 100 goes to step S14 in which, as mentioned before, the current frame is set as the first frame based on the output of the frame counter 138. As described in conjunction with FIG. 10, a total of 6 bits including 3 bits $F_0F_1F_2$ (lower bits) output from the 3-bit frame counter and LSB 3 bits (upper bits) of each of the R, G and B data constitute an address for reading out the dither patterns stored in the R, G and B memories 112, 114 and 116. Thus, as shown in FIG. 10, dither patterns are stored in each of the R, G and B memories 112, 114 and 116 according to addresses. The 3-bit frame counter is reset every time it counts 8 frames. After the reset, the 3-bit frame counter continuously counts the first frame through the eighth frame. The 2-bit line counter and the 2-bit sub-pixel counter count lines and sub-pixels in the current frame, and then output line count signals $L_0L_1$ and sub-pixel count signals $P_0P_1$, respectively, in step S15. In step S16, a dither pattern corresponding to the first frame and LSB 3 bits of each of the R, G and B data is read out from each of the R, G and B memories 112, 114 and 116. The dither sub-pixel values $D_{ij}$ of the read dither pattern and the sub-pixel values $R_{ij}$ of the R data are added by the circuit shown in FIG. 3, thereby outputting dithered data, i.e., dithered R data's sub-pixel values $RO_{ij}$. In step S17, a dithered 4×4 data block of the dithered R data $RO_{ij}$ is repeatedly displayed on the LCD panel 102 in the first frame in the aforementioned manner. Since the first frame is not the last frame in step S18, the frame number is increased by one and the next frame is set as the current frame in step S19. The above steps S15, S16, S17 and S18 are repeated in the second frame, which is the current frame. In this manner, the above-described processes are repeated until the current frame is the last frame or the eighth frame, and steps S14~S20 are repeated until the 2D image display process ends.

Although it has been described that the present invention is applied to a Data Enable (DE) operation mode in which the DE signal is controlled without vertical and horizontal sync signals from the computer graphics controller card, the present invention may be used even in the operation mode in which the vertical and horizontal sync signals, image data, and the main clock are provided. It can be easily understood by those skilled in the art that because the DE signal can be detected when the vertical and horizontal sync signals are provided without the DE signal, the present invention can be applied.

So far, the process of storing the dither sub-pixel values of the dither patterns shown in FIG. 9 in the image memory 210 for the 3D image display according to the present invention has been described. As can be seen from FIG. 9, since the adjacent odd and even frames have the same dither patterns, redundant dither sub-pixel values are stored in a duplicate manner. To avoid the duplication, a modified embodiment may be provided, in which the dither patterns shown in FIG. 10 may be stored in the image memory 210 for the 3D image display. In this case, a total of 6 bits including counter outputs $F_1F_2F_3$ (lower 3 bits) of the frame counter 138 shown in FIG. 7 and LSB 3 bits of the image data may be used as an address for reading out the dither patterns from the image memory 210. In such cases, when the frame counter 138 counts 16 frames, it is possible to read out the same dither patterns in the adjacent odd and even frames, from the image memory 210.

As is apparent from the foregoing description, in displaying the 3D images, the present invention can prevent the dithering noise phenomenon because it uses the same dither patterns in the adjacent odd and even frames.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for generating dithered image data for stereoscopic image display, the method comprising:
   reading out dither sub-pixel values according to an address that includes predetermined bits of image data and bits representing one of a plurality of frames; and
   adding the dither sub-pixel values to image sub-pixel values of the image data and generating dithered image data for each of the frames,
   wherein in the dithered image data, adjacent odd and even frames among the frames have the same dithered image data, the odd frames corresponding to one of a set of left-eye images and a set of right-eye images, the even frames corresponding to another one of the set of left-eye images and the set of right-eye images.

2. The method of claim 1, wherein pairs of adjacent odd and even frames have different dithered image data.

3. The method of claim 1, wherein the predetermined bits of image data is a subset of the image data.

4. An apparatus for generating dithered image data for stereoscopic image display, the apparatus comprising:
   an image memory for storing dither sub-pixel values according to an address that includes predetermined bits of image data and bits representing one of a plurality of frames; and
   an image logic and adder unit for generating dithered image data for each of the frames by adding dither sub-pixel values, which are read out from the image memory using the address, to image sub-pixel values of the image data so that adjacent odd and even frames among the frames have the same dithered image data, the odd frames corresponding to one of a set of left-eye images and a set of right-eye images, the even frames corresponding to another one of the set of left-eye images and the set of right-eye images.

5. The apparatus of claim 4, wherein pairs of adjacent odd and even frames have different dithered image data.

6. The apparatus of claim 4, wherein the predetermined bits of image data is a subset of the image data.

7. A stereoscopic image display apparatus for allowing a user to view a stereoscopic image using liquid crystal shutter glasses having a left-eye liquid crystal and a right-eye liquid crystal, the apparatus comprising:
- a Liquid Crystal Display (LCD) panel including a plurality of sub-pixels arranged between data lines and gate lines;
- a gate driver for scanning the gate lines;
- a data driver for providing analog sub-pixel values from image data, which have left and right image data, to the data lines; and
- a data processor for generating left image data in periods of odd frames by adding left dither sub-pixel values to image sub-pixel values of image data received when the left-eye liquid crystal is turned on and the right-eye liquid crystal is turned off, and generating right image data in periods of even frames by adding right dither sub-pixel values to image sub-pixel values of image data received when the left-eye liquid crystal is turned off and the right-eye liquid crystal is turned on,
- wherein frames in each of pairs of adjacent odd and even frames have the same image data, each pair including an odd frame and its succeeding even frame.

8. The stereoscopic image display apparatus of claim 7, wherein the pairs of adjacent odd and even frames have different image data.

9. The stereoscopic image display apparatus of claim 7, the left and right images are generated by using a dither pattern formed in a 4×4 dither block consisting of dither sub-pixels.

10. The stereoscopic image display apparatus of claim 9, the dither pattern is used to display a first number of frames when displaying a 3D image, while the dither pattern is used to display a second number of frames when displaying a 2D image, wherein the first number of frames is double the second number of frames.

11. The stereoscopic image display apparatus of claim 7, the number of gray levels for the image data increases by adding the left dither sub-pixel values and right dither sub-pixel values.

12. A method for generating dithered image data for stereoscopic image display, the method comprising:
- determining whether displaying stereoscopic image is selected;
- adding the dither sub-pixel values to image sub-pixel values of image data and generating dithered image data for each of a plurality of frames; and
- displaying the dithered image on a display panel;
- wherein in the dithered image data, when displaying stereoscopic image is selected, adjacent odd and even frames among the frames have the same dithered image data, the odd frames corresponding to one of a set of left-eye images and a set of right-eye images, the even frames corresponding to another one of the set of left-eye images and the set of right-eye images.

13. A stereoscopic image display apparatus for allowing a user to view a stereoscopic image, the apparatus comprising:
- a display panel including a plurality of sub-pixels arranged between data lines and gate lines;
- a gate driver for scanning the gate lines;
- a data driver for providing analog sub-pixel values from image data, which have left and right image data, to the data lines; and
- a data processor for generating left image data in periods of odd frames by adding left dither sub-pixel values to image sub-pixel values of first image data, and generating right image data in periods of even frames by adding right dither sub-pixel values to image sub-pixel values of second image data,
- wherein frames in each of pairs of adjacent odd and even frames have the same image data, each pair including an odd frame and its succeeding even frame.

\* \* \* \* \*